United States Patent [19]
Labelle et al.

[11] Patent Number: 5,919,038
[45] Date of Patent: Jul. 6, 1999

[54] METHOD FOR THE CALCINATION OF CALCIUM CARBONATE BEARING MATERIALS

[75] Inventors: Gerald J. Labelle; Sidney M. Cohen, both of Allentown; William E. Lindquist, Schnecksville; Michael E. Prokesch, Zion Hill, all of Pa.

[73] Assignee: Fuller Company, Bethlehem, Pa.

[21] Appl. No.: 08/609,143

[22] Filed: Feb. 29, 1996

[51] Int. Cl.⁶ .................................................. F27B 15/00
[52] U.S. Cl. ................................ 432/14; 432/58; 432/106
[58] Field of Search .............................. 432/14, 58, 106

[56] References Cited

U.S. PATENT DOCUMENTS

| | | | |
|---|---|---|---|
| 3,989,446 | 11/1976 | Grill et al. ................................. | 432/14 |
| 4,128,392 | 12/1978 | Tock ........................................... | 432/58 |
| 4,218,209 | 8/1980 | Herchenbach et al. .................... | 432/14 |
| 4,496,396 | 1/1985 | Steinbiss et al. ......................... | 432/106 |
| 5,260,041 | 11/1993 | Cohen et al. .............................. | 432/14 |

Primary Examiner—Teresa Walberg
Assistant Examiner—Gregory A. Wilson
Attorney, Agent, or Firm—Daniel De Joseph

[57] ABSTRACT

The invention relates to a method for heat treatment of fine calcium carbonate bearing material comprising preheating fine material containing a coarse and a fine fraction. The preheated material is delivered into a fluidized bed calcining means wherein the coarse fraction is calcined and the fine fraction is delivered by process air to an adjacent vertically arranged gas flash calciner furnace in which it is calcined.

13 Claims, 5 Drawing Sheets

METHOD FOR THE CALCINATION OF CALCIUM CARBONATE BEARING MATERIALS

FIELD OF THE INVENTION

The invention relates to a method of calcinating calcium carbonate bearing materials, such as limestone and dolomite fines.

The process of this invention may be utilized, for example, to calcine the vast quantities of the limestone/dolomite fines currently discarded during the feed preparation process for the shaft kiln, stone preheater kiln and straight kiln calcination systems that are the current method of choice for producing lime and dolime.

More specifically, this process can advantageously utilize an unusually wide range of feed sizes, particularly a wide range having a feed with a top size at least in the range ¼" to ⅜" or even as high as ½". In addition to the calcination of limestone fines, the design of the present system accommodates the processing of partially-calcined fines collected at the particulate filtration units during the current methods of lime production. The process of the present invention is also advantageous in that it can heat treat limestone fines without the necessity of first subjecting such fines to extensive comminution and separation steps.

The limestone calcined hereunder and the production of lime is understood to include dolomite and like materials composed of a carbonate fraction that decomposes upon thermal treatment.

While processes exist for the calcination of limestone material, they place restrictions on the feed top size or feed bottom size. For example, typical suspension flash calcination processes require the preparation of a feed with a top size of only 1170 microns (12 mesh U.S.). In most cases, this necessitates crushing and sizing a majority of the limestone fines, typically minus ¾ inch, which generates additional minus 47–75 micron fines that cannot be efficiently recovered. Conventional fluid bed calciner systems require a feed characterized by a narrow size range that is suitable for fluidization, thereby permitting the recovery of either the coarser fractions (¼"×1170 micron) or the intermediate fractions (1170×400 micron). Conventional fluid bed calcining of coarse fractions leads to the generation of limestone fines during the sizing process that must be disposed of or sold as a low-cost calcium carbonate source.

It would be advantageous, therefore, to have an apparatus and process for calcining a wide range of sizes of the fines of limestone and other materials.

The calcination system herein described combines fluid bed and flash calciner functions into a single system which permits the calcination of at least a ⅜"×0 feed material to minimize and, in some cases, eliminate crushing and sizing. In the present system and apparatus, all finer fractions are processed, and therefore no screening wastes are generated. As the system of the present invention is capable of calcining fines, it permits recycling of partially-calcined fines collected at the particle filtration system to offer a near 100% recovery potential. The flexibility of the system in terms of particle residence time and temperature control provided permits a variation of the lime residual $CO_2$ levels and the lime hydration reactivity to meet the demands of a diverse market.

The present interest in fine lime and dolime products can be utilized to serve the varied markets for these products. Some of the current market areas for fine lime include soil stabilization; FGD scrubbers (power stations); direct injection of lime into boilers for $SO_2$ control; precipitated carbonate for paper coating; waste stream neutralization; mining and recovery applications of copper, gold and alumina ores; and chemical grade hydrates.

The present process has been found suitable for processing fines of limestone and dolomite, by utilizing a unit that combines bed suspension and flash calcination zones. In one embodiment of the present process fuel (solid, liquid or gas) and air are injected at controlled rates at multi-levels of the flash calcining unit. The incoming feed is preheated by the off-gases from the calcining units, and is thereafter first fed into the fluid bed calciner.

The invention is advantageous in that it allows for the simultaneous processing of feed sizes of at least ¼" to ⅜" top size along with very fine feed sizes.

SUMMARY OF THE INVENTION

The invention relates to a method for heat treatment of calcium carbonate bearing material that, in a preferred embodiment, comprises:

(a) preheating the calcium carbonate bearing material;

(b) delivering the preheated material into a bed calcining zone wherein a coarser fraction of said preheated material is maintained and a finer fraction is conveyed by process gas to an adjacent flash calcining zone;

(c) calcining the material in both zones; and (d) collecting the calcined product from both zones.

DESCRIPTION OF THE DRAWINGS

The invention will be described in connection with the annexed drawings which are not considered to limit the invention.

Numerals will stay consistent throughout the drawings for similar features.

DETAILED DESCRIPTION OF THE INVENTION

Figure 1:
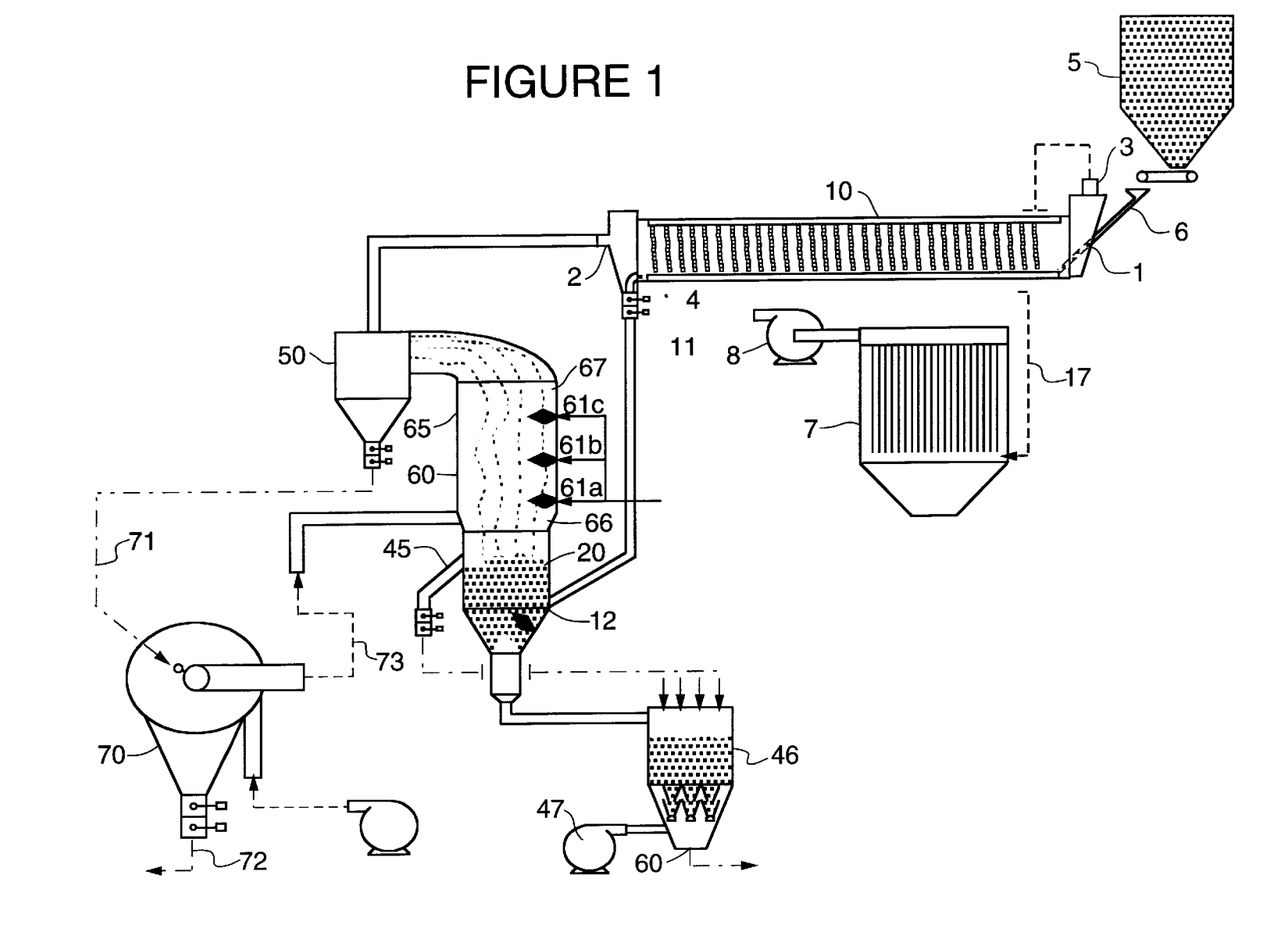
FIG. 1 illustrates a calcining system of the present invention.
Figure 4:
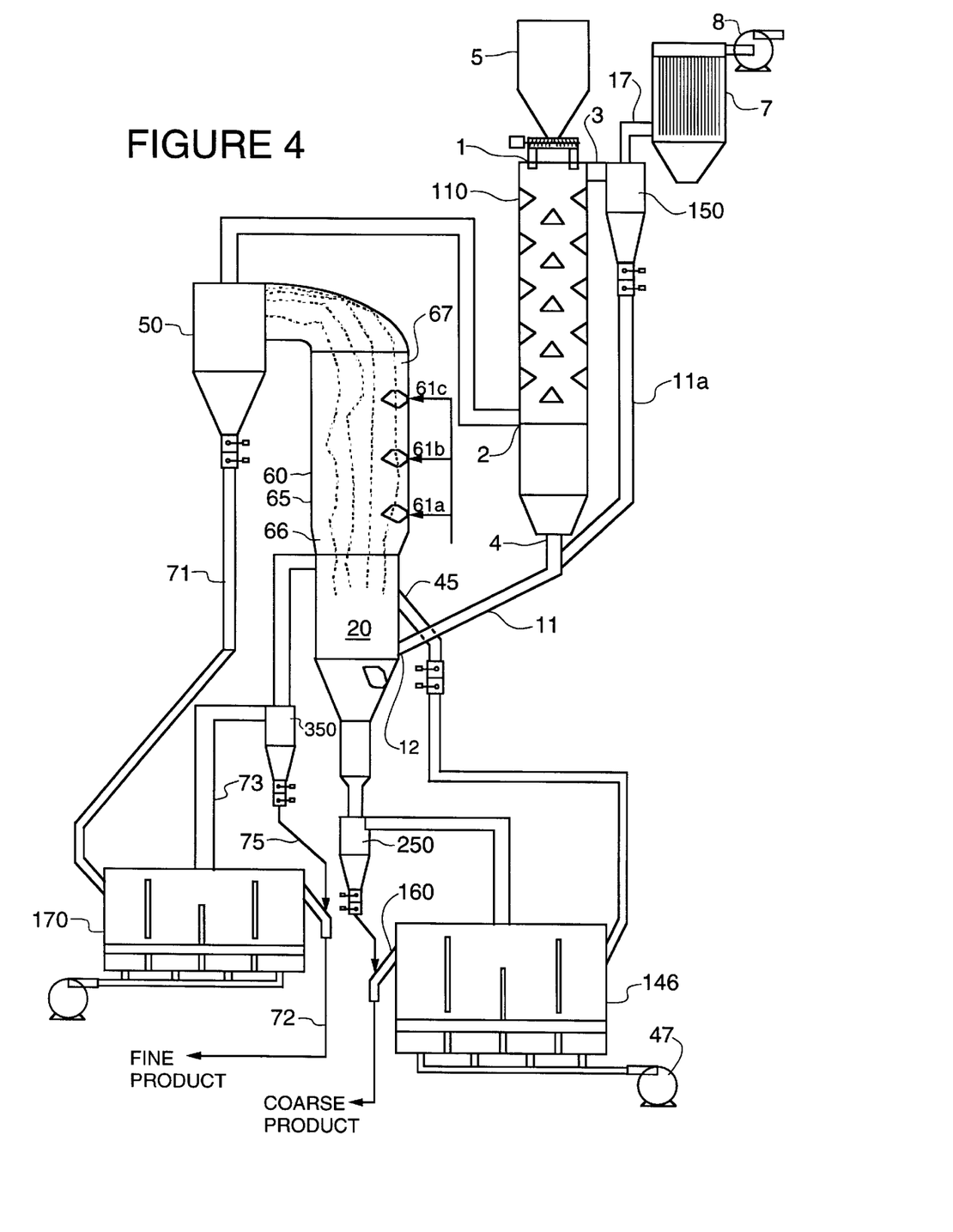
FIG. 4 illustrates another embodiment of a calcining system of the present invention in which, inter alia, a raining bed material preheater is utilized.

Referring to FIG. 1 and, for like elements, FIG. 4, feed is distributed to the system via (in FIG. 1) conduit 6 from a feed bin 5. Such feed may be first prepared from an optional feed preparation circuit (not shown). The feed is first preheated in the preheater section generally indicated by 10 (or 110 in FIG. 4), the heat for which is provided by the process gas from the calcination zone of the unit via inlet 2. The wet limestone fines are conveyed to the preheater unit. This preheater may be a rotary design as depicted in FIG. 1, suspension design, packed bed design, or counter-current free fall design (e.g., raining bed) as shown in FIG. 4, which free fall design subjects the material to a counter-current flow of heated air from the calcination zone. The counter-current free fall design is preferred as it has been discovered that it readily accepts a fine, wet feed and can effectively preheat a material characterized by a wide size distribution. The preheater facilitates the transfer of heat from the process gas stream to the limestone feed. In the preheater 10 or 110, substantially all free and bound moisture is removed from the material. optionally, sufficient preheat may be utilized to initiate calcination of the limestone prior to entering the fluid bed calcining zone. In such a case, if the preheater consists of cyclones, it may be a single stage cyclone or more than one stage, such as up to 4 stages of a suspension preheater, which may be used depending on the operating temperature of the calciner and the rate of heat transfer between material and hot gases. The temperatures in the preheater can vary considerably depending on material feed rates, the quantity of process gas flow, calcining furnace temperatures, and the degree of radiation losses from the system.

FIG. 4 illustrates another embodiment of the system of the present invention in which free fall design preheater 110 is utilized. In such a preheater, material to be treated will fall by gravity through the preheater into a rising stream of heated process gas. One such type of preheater which may be employed in the present invention is Tecogen Inc.'s (Waltham, Mass.) "raining bed" preheater.

The flow of material in the preheater is generally counter-current to the flow of hot gas through the preheater. Preheater 10 includes an inlet 1 at the end of conduit 6 for material to be processed, an inlet 2 for preheating gas, an outlet 3 for spent preheating gas and an outlet 4 for preheated material. Thus, the preheater 10 serves to carry out the process step of drying solid material with hot spent preheater gases, which gases travel to preheater 10 from collection cyclone 50. Exhaust gas from the preheater 10 or 110 may be supplied through conduit 17 to a high efficiency dust collector 7 such as a scrubber or fabric filter baghouse with the cleaned air being supplied via fan 8 to exhaust.

As indicated, feed material generally ranges in size from very small fines to particles about ¼" to ⅜" or even ½".

One of the advantages of the present invention is that there is no concern for the size ratio of the largest to smallest size particles treated by the system, which is the case with other units. For example, in a long kiln the maximum size ratio between the largest and smallest particles is only 3:1, and preferably 2:1. Obviously, such a calcining system requires a significant amount of feed preparation prior to the calcination step.

In FIG. 1, when feed material enters conduit 6 it comes in contact with an off-gas stream that comes off preheater 10. Thus, the feed material is preheated while being conveyed to preheater 10 via conduit 6. In preheater 10 the material is mixed with heated gas that is an off-gas from the calcination areas and is separated from it. The gas becomes spent gas and exits to dust collector 7. The separated preheater material exits preheater 10 at outlet 4 and enters, via conduit 11 and inlet 12, bed calciner means 20, for thermal processing the coarser fraction of the material.

FIG. 4 shows another embodiment of the invention in which the spent gas from preheater 110 is first directed through separator cyclone 150. The separated gas is then directed to a high efficiency dust collector 7. Particles separated from the gas are directed to bed calciner means 20 via conduits 11a and 11.

FIG. 4 shows an optional step of passing the exhaust gas from preheater 110 through a separator cyclone 150 wherein separated fines are passed to the bed calciner zone via conduits 11a and 11, with the separated air being supplied to dust collector 7.

In the depicted embodiment in FIGS. 1 and 4, flash calcination means 60 is located directly on top of bed calcination means 20. The vertical flash calcination zone 60 is in fluid communication (i.e. process gas exiting the fluid bed vessel will enter the flash calcination means) with fluid bed means 20. The coarser fraction of the material will remain in the fluid bed means 20. Obviously, the degree of material "coarseness" (put another way, the size of the material remaining in fluid bed zone 20) and "fineness" (the material that is passed on to flash calcining zone 60) will depend to a great extent on the velocity of the gas through bed calciner means 20. It is also understood that separation of the material into fine and coarse fractions may be done prior to the fluid bed calcination step to thereby directly introduce the fine fractions into the flash calcination zone through an optional entry point with the coarse fractions being directly introduced into the fluid bed calcination zone. This is not a preferred method of operation of the present invention, however, since it introduces additional pre-grinding and separation steps.

Figure 2:
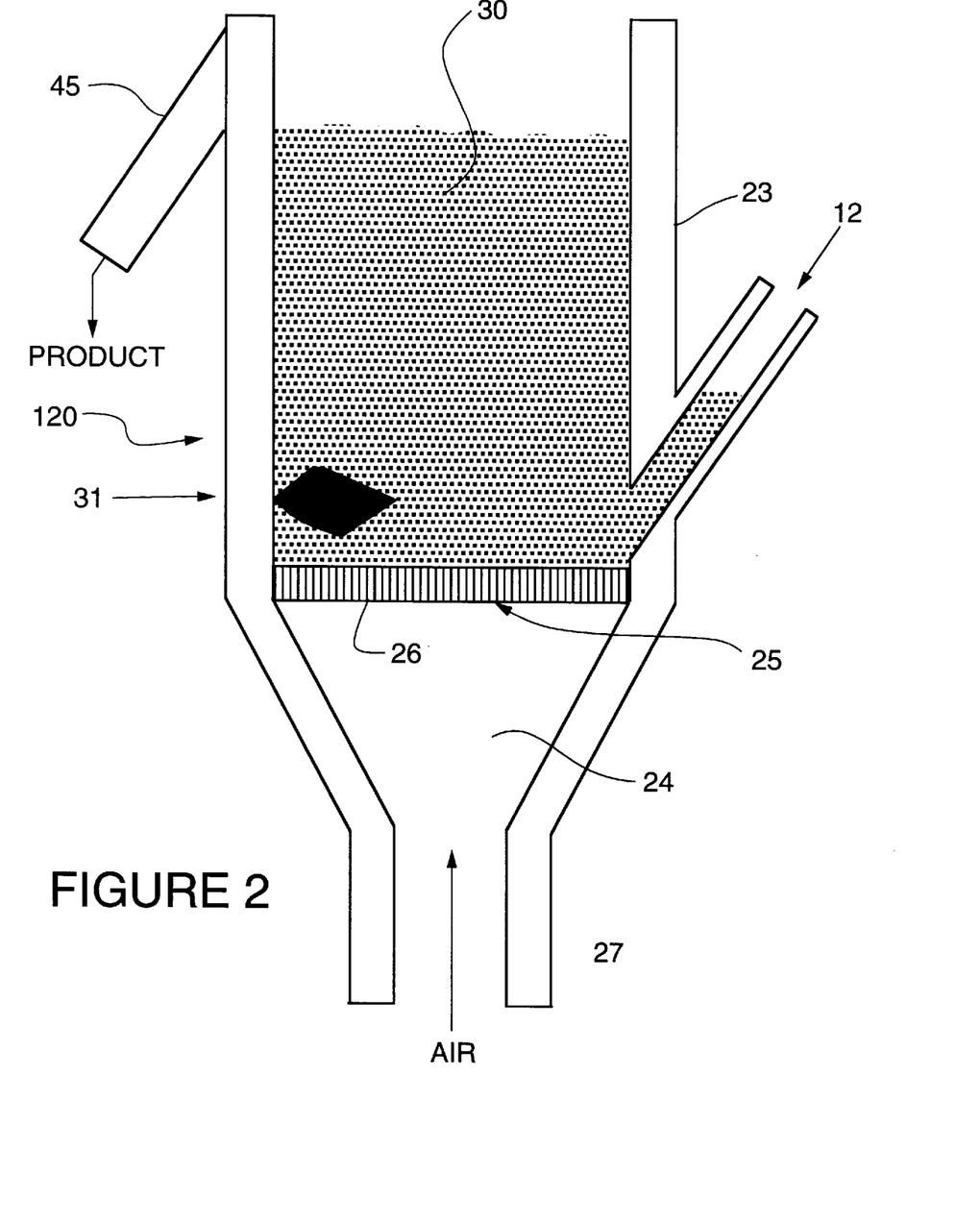
FIG. 2 illustrates a fluid bed calciner which is utilized in one embodiment of a calcining system of the present invention.

The bed calcination means 20 can be a fluidized bed reactor, which is shown in more detail in FIG. 2. The reactor includes a vessel 120 having an inlet 12 for the dried material from the preheater 10. The vessel 120 is divided into an upper material chamber 23 and a lower plenum chamber 24 by means of a gas permeable grid 25 known in the art. Grid 25 (also called an air distribution plate) contains a number of orifice openings or holes 26. The size and quantity of these openings 26 are based on particle sizing and calculated grid pressure drop requirements. A properly designed grid plate 25 generates a pressure drop equal to approximately one half of the bed to ensure even air distribution. A positive displacement blower (not shown) supplies the pressurized air to the plenum via conduit 27. This air, before entering the plenum, may pass through an optional auxiliary air heater (not shown) utilized to bring the reactor up to the fuel ignition temperature (500° C.+). The air will pass through the material being fed to fluid bed reactor vessel 120 and will entrain and carry the finer fraction of the material into a flash calcination zone not shown in FIG. 2.

The volume of pressurized air supplied to the plenum chamber 24 typically generates a superficial fluidization velocity in the fluid bed reactor vessel 120 in the range of thirteen to sixteen feet per second. This maintains the bed material in a highly active fluidized state above the air distribution plate 25. Inadequate velocities result in reduced capacity and poor gas/particle mixing (poor fuel combustion), while extreme velocities lead to rapid particle degradation and entrain a coarser fraction which is sent to flash calciner zone 60 that cannot be properly flash calcined. After the fluid bed combustion becomes self-sustaining, fuel flow to the optional air heater is discontinued and gas/oil fuel injection via fuel inlet 31 is started to elevate the preheat air temperature and to control the fluid bed temperature to obtain the required level of carbonate decomposition and product hydration reactivity; this temperature is typically in the range of 1650° to 2190° F. (900–1200° C.). Means are provided for supplying air under pressure of fluidizing gas to the plenum chamber 24 for passage upwardly through the grid 25 and a bed of feed material to thereby establish and maintain a fluidized bed 30 of nodules. Fuel is supplied through inlet 31 for supporting combustion within the fluidized bed 30. The amount of fuel added is sufficient to maintain the material within the fluidized bed at calcining temperatures.

As material is supplied to the fluidized bed 30, calcined coarser product is discharged, such as by displacement through overflow conduit 45 to cooler 46 (in FIG. 1) or 146 (in FIG. 4). Material discharged from fluid bed reactor 20 is preferably discharged by displacement so that the rate of discharge of material depends upon the rate of feed of material to the vessel. Material retention time is typically on the order of 1 to 2 hours to provide for substantially full calcination of the coarser fractions. The superficial fluidization velocity in the fluid bed zone is selected to maintain an actively fluidized bed above the air distribution plate or grid. The distribution plate 25 provides a pressure drop sufficient to provide uniform air distribution across the bed cross-section. The bed is suspended above the distribution plate 25, and the active particle motion in the bed serves to provide excellent mixing and thermal transfer characteristics. The effective height of the fluid bed is regulated by an overflow duct 45 typically positioned at a height between 2–8 feet above the air distribution plate 25, although this distance may of course vary based on the dimensions of the final system. The theoretical material residence time in the fluid bed is a function of the bed volume, fluidized bulk density and the coarse fraction delivery rate to the fluid bed.

The fluid bed temperature is controlled by the injection of solid, liquid or alternate fuels into the fluid bed immediately above the air distribution plate. This fluid bed zone will typically operate between the temperatures of 900–1100° C., although the actual temperature requirement is dependent upon feed calcination characteristics, material residence time, and desired lime product residual $CO_2$ levels and hydration reactivity. The nature of the bed facilitates precise temperature control to allow underburning or overburning of the fine lime.

As indicated, the apparatus and system of the present invention is comprised of two calcination zones: (1) a fluidized bed zone in which the coarser fractions are retained in a fluidized bed and (2) a flash suspension calcination zone to which the finer fractions are carried from the fluidized bed zone. In said suspension calcination zone the fines fractions will be calcined while entrained by the process gas stream.

Figure 3:
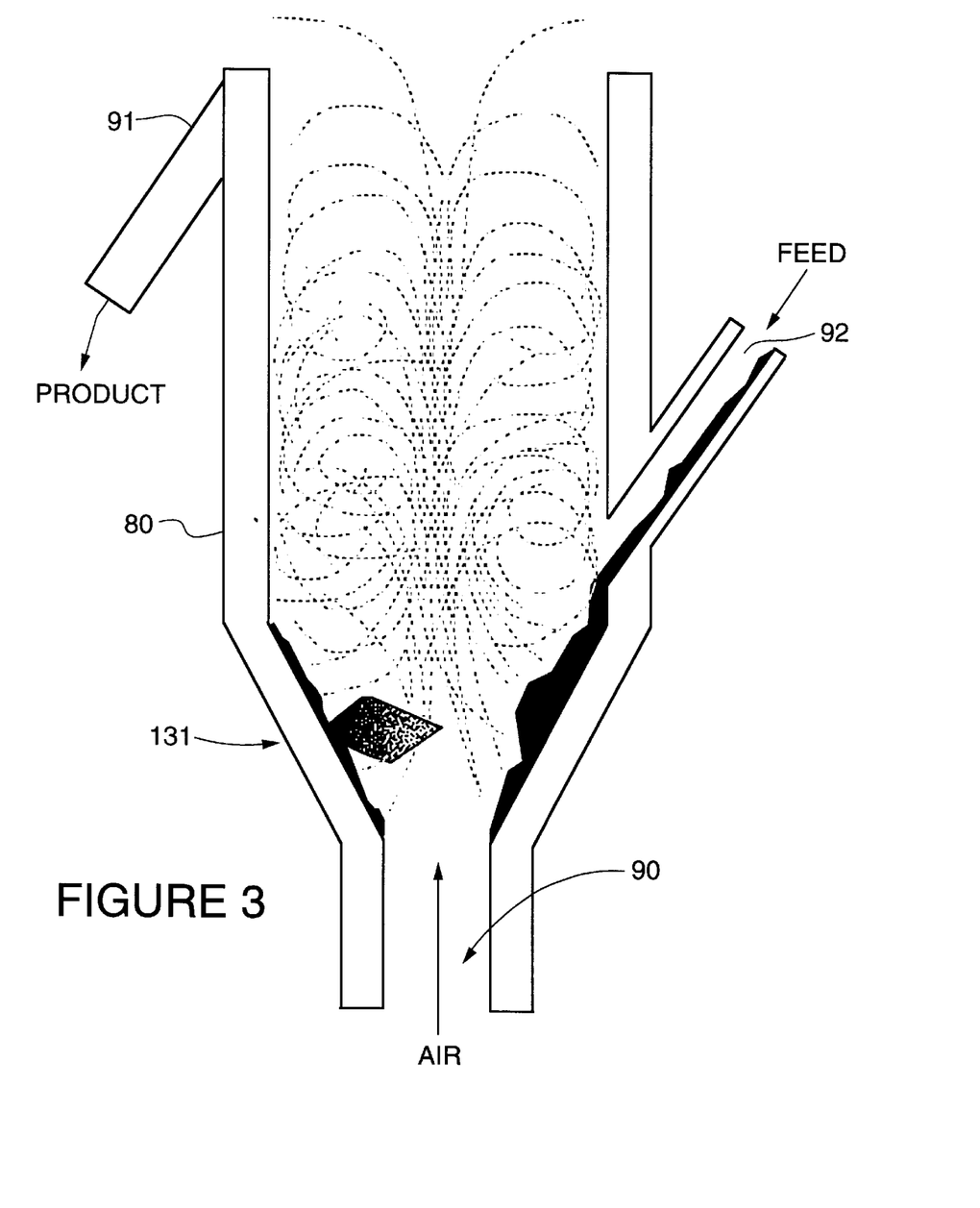
FIG. 3 illustrates a spouting bed type fluid bed calciner which is utilized in another embodiment of a calcining system of the present invention.

In another embodiment of the present invention, another bed suspension means, a spouting bed system, as shown in FIG. 3, may be utilized in place of the fluid bed system set forth above. The spouting bed reactor includes a vessel 80 having an inlet 92 for the dried material from the preheater. The spouting bed vessel 80 also provides an extended material residence time of up to two hours. The superficial fluidization velocity in this zone is selected to maintain an actively fluidized bed above the high velocity inlet throat section 90. This high velocity throat (+6000 fpm) replaces the typical air distribution plate required for fluid bed processing, thereby reducing the overall system pressure drop. The use of a single inlet 90 duct rather than multiple small diameter orifices as in the fluid bed system described above presents the advantage of allowing for the use of particle laden preheated air while minimizing the potential for dust related blockages at the inlet to the system. The bed is suspended above the throat, and the jetting action produced in the center of the bed serves to generate a spouting action for excellent mixing and thermal transfer characteristics. The effective height of the spouting bed is regulated by an overflow duct 91 positioned at a height which may vary based on material characteristics, but for a commercially sized system will range from between 2–8 feet above the throat section. The theoretical material residence time in the spouting bed is a function of the bed volume, fluidized bulk density and the coarse fraction delivery rate to the spouting bed. Fuel is supplied through inlet 131 for supporting combustion within vessel 30.

Product discharged through conduit 45 is supplied to cooler means 46 (or 146) where it is cooled, preferably by direct contact heat exchange (although indirect gas contact may be utilized) with cooling air supplied from a source such as a blower 47. Air heated in the cooler means by contact with the product may be recycled to the process, such as by utilizing the thus heated cooling air for drying materials in an optional feed preparation circuit thereby reducing overall fuel consumption of the process. Product discharged from cooler 46 through outlet(s) 48 may, depending upon the raw material content and the temperature of bed 30 in a fluid bed system, be either cement clinker or an intermediate product. If desired, cold water coils can be used for the final cooling step of the product in heat exchanger 46.

FIG. 4 illustrates an optional fluid bed cooler 146 having material outlet 160. Such a cooler will preferably have multiple compartments as known in the art. In FIG. 4 spent gas from cooler 146 will pass to separator cyclone 250, with separated air being directed to bed calciner means 20.

As indicated, fines, i.e. a fine fraction typically with a top size in the range of 16–20 mesh are conveyed out of the fluid bed calcining zone 20 into the flash suspension calcination zone 60 by being entrained in process gas. The breakdown between the material being carried to the flash calciner and the material retained in the fluid bed calciner will be a function of the process gas velocity and particle terminal velocity, which can be increased or decreased to, correspondingly, increase or decrease the top size of material that is conveyed to the flash calcining zone. The flash suspension calcination zone typically provides a retention time of about 2–3 seconds to allow full calcination of the finer fractions without overburning the lime. The velocity of the process gas stream in this zone is similar to the superficial fluidization velocity utilized in the fluid bed, and may be adjusted by geometry considerations to effectively convey the desired fine fractions through this zone.

The calcined fine lime from zone 60 will pass on to cyclone cooler 70 (FIG. 1), which is a device for cooling the material by suspending it in ambient air, or fluid bed cooler 170 (FIG. 4) via conduit 71. Product exits the cooler via conduit 72. Process gas may be optionally recirculated back into a calcination zone via conduit 73. FIG. 4 shows a further optional embodiment wherein a gas/solids separator 350 is employed in line to separate fines from the off gas stream. The separated fines are passed to product via directly from the conduit 75.

The flash furnace calciner utilized in the apparatus of the present invention includes a vertically oriented elongated suspension or calcining furnace generally indicated at 60 and defined by a vertical calcining column 65 having a lower end, generally indicated as 66, and an upper end generally indicated as 67. Material typically will enter the flash calciner 60 directly from fluid bed calciner 20. Optionally, and depending on the capacity of the system, there may be an entry point (not shown) for additional fine material, that is, material that does not enter the flash calciner directly from the fluid bed calciner. Optionally, such additional material may be introduced at any point in the vessel, depending on the desired qualities of the product to be produced by the process of the present invention. After entering vessel 60, the material will continue through the vessel entrained in the stream of preheater air from the fluid bed calciner 20, which may be augmented with additional air, such as recycled air from cooler 70 (170), as specified above. The entrained material will then be conveyed up the ascending length of the vertical calcining column.

In a preferred embodiment, a multi-level fuel injection system is utilized to inject fuel (liquid or solid) at a number of levels, typically 3–4, (three points are depicted in FIGS. 1 and 4 as points 61a, 61b, and 61c) to provide numerous points of contact between combusting fuel and the limestone fines. Depending on the diameter of the system, a number of burners may be spaced around the perimeter of the flash calciner at each level to improve flame coverage. This flame contact improves calcination efficiency for a given temperature and residence time, and, in most cases, permits control of the lime product hydration reactivity. Typical operating temperatures in this zone are expected to be in the range of about 1100–1200° C. The actual temperature requirement is dependent upon feed calcination characteristics, material residence time, and desired lime product residual $CO_2$ levels and hydration reactivity. The fine lime produced in this zone is separated from the process gas stream at a cyclone collector or settling chamber 50. As previously mentioned, fines from the particulate filtration unit may be injected directly into the bottom of the flash calcining zone. As indicated, in a preferred embodiment of the invention there are, spaced axially relation along the ascending column 65, a plurality of burners, which may be comprised of separate manifolds for, respectively, air and fuel. Preferably, in at least one burner level, there are a plurality of burners circumferentially spaced around the furnace in a single horizontal plane. Most preferably, the burners are individually controlled. The objective of having a plurality of burners at a multiple of levels of the gas suspension calciner 60 is to have more flame quenching retention time for the limestone and/or dolomite preheated raw material at a controlled uniform temperature profile. In addition, increasing the material's direct exposure to combusting fuel decreases the total retention required in the flash furnace.

The flash furnace ideally will be adaptable for using both solid and liquid fuels, and both solid and liquid fuels will preferably be simultaneously utilized at different burner levels.

Preferably, the flame pattern created by the burners will encompass substantially the entire furnace cross-sectional area in order to guarantee contact between material and combusting fuel at each level, although, a less extensive flame pattern may be acceptable depending upon the needs of the practitioner of the invention. A flame pattern encompassing substantially the entire cross sectional area is generally produced by there being a plurality of burners at each burner level, although the number of burners needed to maintain a uniform flame pattern will be dependent to some extent on factors such as the interior cross-sectional area of the furnace. Typically, two to four burners on each level, circumferentially spaced around the furnace in each horizontal plane, will give the preferred flame pattern.

After exiting the flash calciner 60 the calcined material will pass to cyclone separator 50, where it will be separated from the heated gas and passed to product. Optionally, the calcined material will be introduced into one or more cooling cyclones where it will intermix with cooling air.

In the preferred practice of the present invention, the temperature within the flash calciner furnace will be maintained approximately between 1000° C. and 1250° C., while the temperature difference throughout the upper and lower sections of the furnace will be preferably less than 100° C., and most preferably less than 50° C. The flash furnace temperature normally runs at an even 1150° C. (2100° F.) and the feed is only subjected to this temperature for a few seconds. Because of the low temperature and short retention time there is little if any chance for the CaO crystals to agglomerate thereby leaving the limestone porosity intact. The exit gas temperature at outlet 51 should also preferably be maintained in the temperature differential range mentioned above. Product discharged from cyclone 50 will preferably have a temperature within 100° C. to 300° C. of the furnace exit temperature, and ideally above 900° C. to prevent recarbonization. It is to be understood that for thermal processing of limestone, other temperatures may be appropriate and those skilled in the art will be able to achieve the desired temperature through routine experimentation. For example, processing temperatures in the calciner for highly reactive lime is between about 1100° C. to about 1150° C.

The desired retention time within the flash calciner is obviously dependent on the reactivity of the material being processed. The retention time is obviously, a function of the velocity of the gas stream through the flash calciner. For most applications when the burner means consists of individually controlled burners the velocity of the gas stream through the furnace will range from between approximately 3 meters/second to approximately 12 meters/second, although velocities outside this range can be utilized depending upon the material being processed.

The flash calciner accomplishes the calciner reaction in a mode called "gas suspension calcining" in which the lime particles are conveyed through the system via the combustion gas flow similar to dilute phase pneumatic conveying.

The overall retention time in a flash calciner furnace itself is a matter of a few seconds. The short retention time in the flash calcining system necessitates the use of relatively small feed to accomplish the calcining operation in time. The typical feed size range, i.e., the "fine product" range, for the flash calciner feed is about 0 to about 16–20 mesh. The top size can be increased somewhat depending on the type of furnace design, the type of feed being calcined, and the product specification requirement.

The fluid bed and flash calcined lime product may be recombined following discharge from the two zone calciner. If a combined product is desired, a heat exchanger suitable for handling a fine material must be utilized to cool the product while providing preheated air for the calcining process. Ideally, an indirect transfer device, static tube or rotary tube designs, would be used to prevent the re-entrainment of fine lime particles in the preheated airstream. From an efficiency standpoint, a direct contact cooler offers a better rate of heat transfer. This direct contact cooler may be of a cyclone design, static bed or fluidized bed. The preheated air provided by this cooling device may be fed to the system undivided through the fluid bed zone, or split to provide sufficient air to support spouting bed operation while adding the remaining air to the flash calcining zone immediately above the fluid bed.

If separate coarse and fine products are acceptable, two cooling devices are utilized. The coarse product can be efficiently cooled in a static bed design with minimal pressure drop and no entrainment of fines in the preheated air. Preheated air from the coarse product cooler is directed to the plenum area of the fluid bed, or, when a spouting bed is utilized, to the throat of the spouting bed. The fine flash calcined product can be effectively cooled in a suspension cyclone cooler design or a multi-pass cyclone cooler design, and this preheated air fed to the bottom of the flash calcining zone. If the fine flash calcined product represents only a small percentage of the total system output, only one direct contact cooler may be used to cool the coarse product and then combine the two products downstream of the cooler.

Both the fluid bed and spouting bed systems combine the advantages characteristic of fluid bed and suspension flash calcination system in terms of $NO_x$ and $S_xO$ emissions. Fuel injection into a fluidized bed does not generate a high intensity flame that is a primary source of the formation of nitrous oxides. In addition, the flame quenching that occurs in the suspension calcination zone also serves to inhibit $NO_x$ formation. The nature of the lime process lends itself to good $SO_x$ absorption by the lime product. This mechanism is improved in this system as the high surface area of the fine lime product in suspension will readily scrub $SO_x$ present. Therefore, $SO_x$ and $NO_x$ emissions are expected to be lower than the conventional lime calcination process.

A flash calciner standing alone requires an extensive amount of crushing since the material must be prepared to minus 10 mesh size. However, the present invention is advantageous since there is significant undersize material being wasted at plant locations. The present invention is ideally suited for such locations since it can take material as currently prepared without additional preparation.

Figure 5:
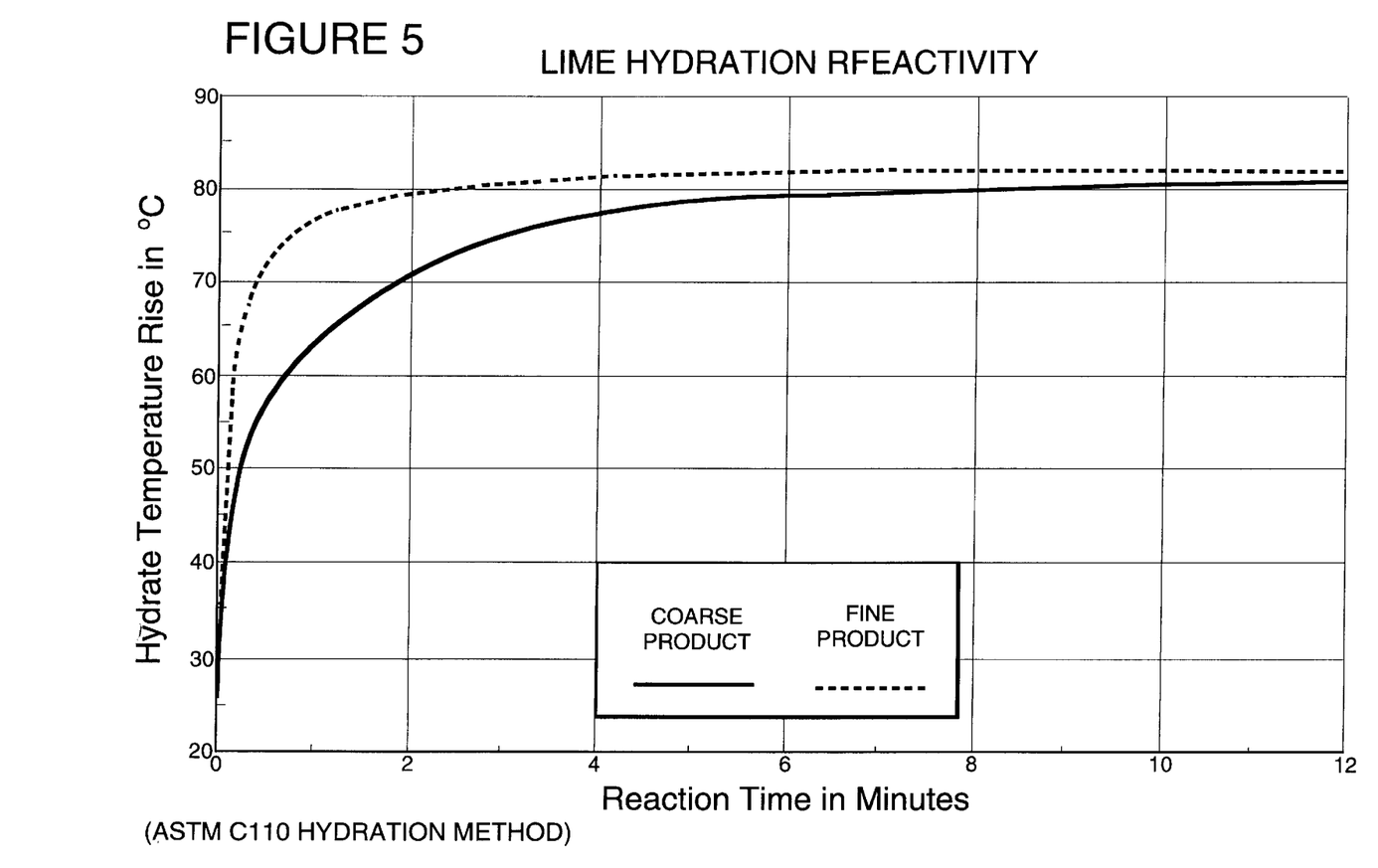
FIG. 5 is a depiction of a chart illustrating the reactivity of a lime product, both coarse and fine, formed according to the process of the present invention.

FIG. 5 illustrates the hydration quality based on the ASTM C-110 method with curves directed to the product produced from, respectively, a spouting bed calciner (solid line) and a flash calciner (broken line). Using these calcination methods, two separately sized products are produced with a conversion efficiency to available lime of 97 percent. This is better than most stone preheater systems operating on coarser rock, which average 95–96 percent conversion efficiency.

It is intended that the foregoing be a description of a preferred embodiment, but that the invention be limited solely by that which is within the scope of the intended claims.

We claim:

1. A method for heat treatment of calcium carbonate bearing material comprising a coarse fraction of material and a fine fraction of material, said method comprising:
   a. preheating the calcium carbonate bearing material;
   b. delivering the preheated material into a bed calcining zone of a calcining apparatus wherein a coarser fraction of said preheated material is maintained and a finer fraction of said preheated material is entrained in process gas and thereafter directly delivered to a flash calcining zone located directly above said bed calcining zone;
   c. calcining the material in both zones; and
   d. collecting the calcined product from both zones.

2. The process of claim 1 further comprising utilizing the process gas to preheat the calcium carbonate bearing material.

3. The process of claim 1 wherein the calcium carbonate bearing material is limestone.

4. The process of claim 1 wherein the calcium carbonate bearing material is dolomite.

5. The process of claim 1 wherein the flash calcining zone contains a plurality of burners into which fuel and air are injected.

6. The process of claim 5 wherein the burners are vertically spaced from each other at a plurality of levels in the flow direction of the heated gas.

7. The process of claim 6 wherein, in at least one burner level, there are a plurality of individually controlled burners circumferentially spaced around the furnace in a single horizontal plane.

8. The process of claim 7 wherein the individually controlled burners generate a flame profile throughout substantially the entire interior cross sectional area of the furnace.

9. A process of producing a calcined limestone product comprising the steps of:
   a. preheating a feed material containing a fine and coarse fraction;
   b. establishing and maintaining a fluidized bed of the coarse feed material by supplying the material to a vessel and passing air upwardly through the material within the vessel at a velocity sufficient to maintain the coarse material in a fluidized state and to entrain the fine material;
   c. thermal processing the feed material within the fluidized bed to produce a calcined limestone product;
   d. directly passing the entrained fine feed material to a bottom of a generally vertically oriented gas suspension calcining furnace located directly above the vessel, whereby said entrained material passes vertically upwardly through the gas suspension calcining furnace and is calcined therein;
   e. collecting the calcined product from both the vessel and the gas suspension calcining furnace.

10. The process of claim 9 wherein the feed material has a top size of ½".

11. The method of claim 9 wherein the material is preheated by free falling through a counter-current flow of heated air.

12. A process of producing a calcined limestone product comprising the steps of:
   a. preheating a feed material containing a fine and coarse fraction;
   b. establishing and maintaining a fluidized bed of the coarse feed material by supplying the material to a vessel and passing air upwardly through the material within the vessel at a velocity sufficient to maintain the coarse material in a fluidized state and to entrain the fine material;
   c. thermal processing the feed material within the fluidized bed to produce a calcined limestone product;
   d. passing the entrained fine feed material to a bottom of a generally vertically oriented gas suspension calcining furnace located in fluid communication with the vessel, whereby said entrained pass vertically upwardly through the gas suspension calcining furnace and is calcined therein;
   e. collecting the calcined product from both the vessel and the gas suspension calcining furnace;
   wherein the feed material is preheated by heat recovered from the gas suspension calcining furnace.

13. A process of producing a calcined limestone product comprising the steps of:
   a. preheating a feed material containing a fine and coarse fraction;
   b. establishing and maintaining a fluidized bed of the coarse feed material by supplying the material to a vessel and passing air upwardly through the material within the vessel at a velocity sufficient to maintain the coarse material in a fluidized state and to entrain the fine material;
   c. thermal processing the feed material within the fluidized bed to produce a calcined limestone product;
   d. passing the entrained fine feed material to a bottom of a generally vertically oriented gas suspension calcining furnace located in fluid communication with the vessel, whereby said entrained pass vertically upwardly through the gas suspension calcining furnace and is calcined therein;
   e. collecting the calcined product from both the vessel and the gas suspension calcining furnace;
   wherein an additional amount of a fine material is added directly to the gas suspension calciner furnace.

* * * * *